Patented Oct. 14, 1930

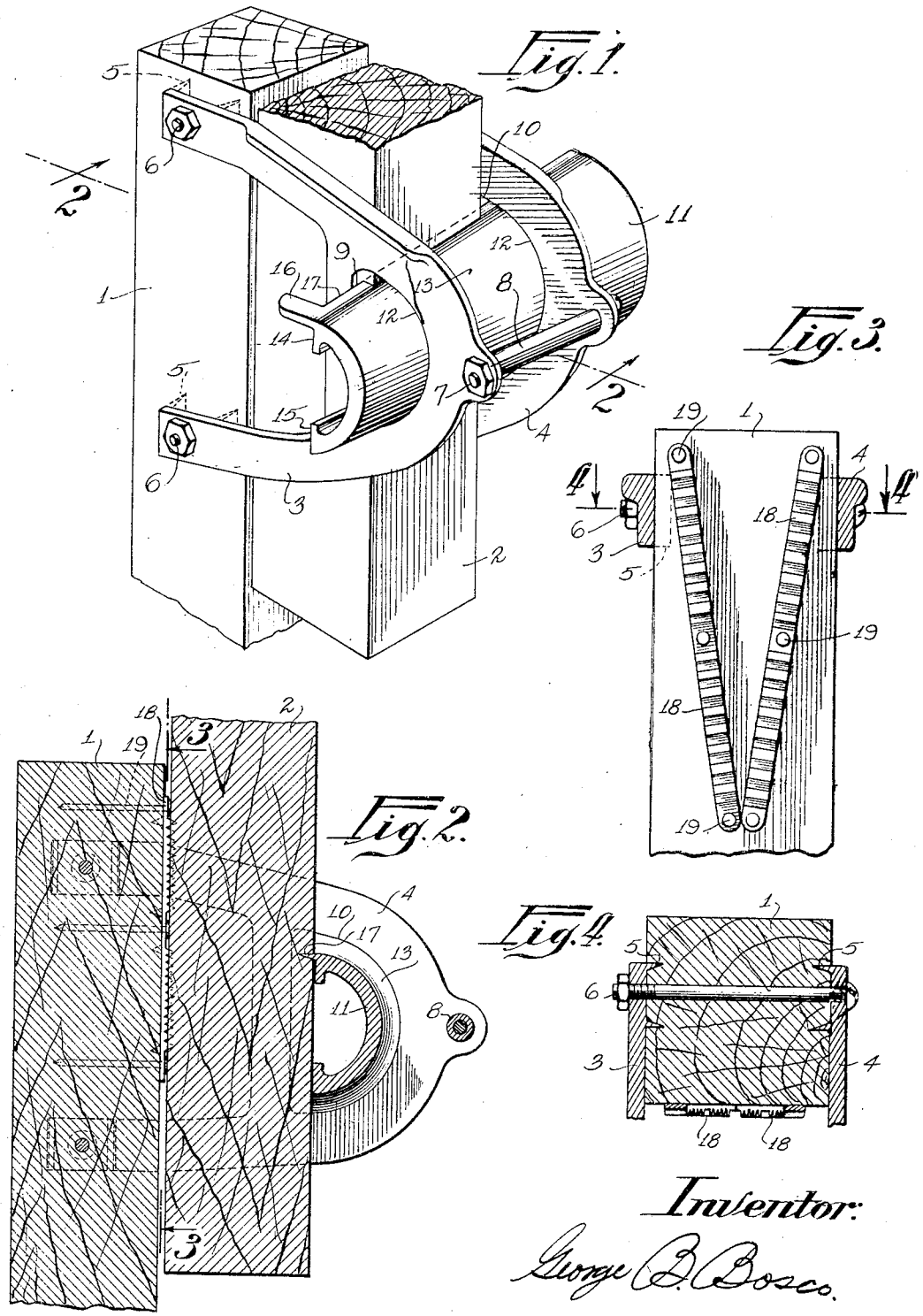

1,778,350

UNITED STATES PATENT OFFICE

GEORGE B. BOSCO, OF CHICAGO, ILLINOIS

CLAMP FOR ADJUSTABLE SHORES

Application filed May 10, 1929. Serial No. 362,079.

The main objects of this invention are to provide an improved form of clamp for adjustably securing together two timbers; to provide an improved timber clamp which is particularly adapted for clamping together the two struts of an adjustable shore; to provide an improved clamp of this kind which is adapted to be supported on one of the struts in position to slidably embrace the other strut; to provide an improved form of wedge for engaging said other strut; to provide improved gripping means adapted to supplement said wedge for securing said struts against relative slippage; and to provide an improved wedge and gripping means of this kind adapted to increase in gripping power with an increase in the load sustained by the struts.

An illustrative embodiment of this invention is shown in the accompanying drawing, wherein:—

Figure 1 is a fragmentary perspective of a shore to which an improved clamp is applied.

Figure 2 is a longitudinal section of the shore, taken on the line 2—2 of Figure 1.

Figure 3 is a longitudinal fragmentary section of the shore, taken on the line 3—3 of Fig. 2, and showing the improved gripping means in elevation.

Figure 4 is a fragmentary transverse section, taken on the line 4—4 of Fig. 3.

A clamp, to which this invention is applied, is adapted for use in securing together timbers of various kinds but, in the specific construction herein shown, the clamp is applied to the overlapping struts 1 and 2 of an adjustable shore.

The two struts are adapted for initial relative adjustment by a suitable jack or adjusting tool, such as that shown in my co-pending application Serial No. 260,822 filed March 12, 1928, or that shown in my Patent No. 1,656,940 issued January 24, 1928.

The struts 1 and 2 are preferably posts of standard construction, such as 4 x 4 timbers, which may be cut to any desired lengths.

In the form shown, the improved clamp comprises a pair of supporting members 3 and 4 arranged in spaced relation to each other for embracing the two struts. Formed on the members 3 and 4, at one end thereof, are inwardly projecting prongs 5, which cut into the strut 1, to which the members 3 and 4 are rigidly secured by bolts 6.

Secured to the other end of the members 3 and 4, is a bolt 7 which supports a spacing sleeve 8.

Formed in the members 3 and 4 adjacent the bolt 7, is a pair of semi-circular openings 9 and 10, respectively, which form a keyway for slidably supporting an improved wedge 11. The concave portions of the keyway form bearing surfaces 12.

In the construction illustrated, the wedge 11 comprises a convex bearing surface 13, fitting within the arcuate surfaces 12 of the keyway, and a pair of substantially flat bearing surfaces 14 and 15 arranged to bear against the outer face of the strut 2. A lug 16 is formed on the small end of the wedge for engagement with the member 3 to secure the wedge against withdrawal from the keyway.

Extending along the outer edge of the bearing surface 14, is a tapered flange 17, which is adapted to cut into the strut 2.

In order to provide a safety factor, which will insure the shore against collapse under excessive loads, improved gripping means is located between the abutting faces of the struts 1 and 2 for supplementing the clamp to prevent appreciable slippage of the struts.

In the construction shown, the gripping means comprises a pair of serrate members 18, which are secured to the strut 1 by nails 19 or other suitable fastening means. As illustrated in Fig. 3, the serrate members are arranged to define a V, with the apex pointing away from the clamp, so that, if the load is excessive, the serrate members 18 will cut into the strut 2 and will compress the material of the strut 2, which is clamped between the two serrate members.

In operation, a rough adjustment of the shore is obtained by manually lifting the strut 2 to approximately the required height. The fine adjustment is then obtained by means of the adjusting tool, not shown. After the struts have been adjusted, the wedge 11 is driven into its keyway so as to bring the surfaces 14 and 15 into effective engagement with the strut 2 and simultaneously force the serrate members 18 into the opposite side of the strut 2.

In the event that there is any relative slippage of the struts after the wedge has been driven inwardly, the excessive load causes the wedge to partially rotate, thereby driving the flange 17 still further into the strut 2. The excessive load also causes the serrate members 18 to compress a portion of the inner surface of the strut 2. With an increase in the load sustained by the shore, there is an increase in the gripping power of the wedge 11 and serrate members 18.

I claim:—

1. In a device of the class described for adjustably securing together a pair of timbers, a support adapted for attachment to one of the timbers, a keyway in said support having an arcuate bearing surface, and a wedge supported in said keyway and having a convex surface contacting with said bearing surface to permit said wedge to roll in contact with said arcuate bearing surface to position one edge of said wedge in gripping engagement with the other timber.

2. In a device of the class described for adjustably securing together a pair of timbers, a clamp comprising a pair of supporting members arranged in spaced relation to each other for embracing the timbers, means at one end of said members for attachment to one of the timbers, spacing means secured to the other end of said members, said members having a pair of openings arranged to form a keyway provided with an arcuate bearing surface, and a wedge longitudinally adjustable in said keyway and having a convex surface contacting with said bearing surface to permit said wedge to roll therein so as to force one edge thereof into gripping engagement with the other timber.

3. In a device of the class described for adjustably securing together a pair of timbers, a clamp comprising a support adapted for attachment to one of the timbers, a keyway formed on said support and having a concave bearing surface, and a wedge longitudinally shiftable in said keyway, said wedge having a convex surface engaging said concave bearing surface to permit said wedge to roll in said keyway.

4. In a device of the class described, the combination with a pair of overlapping struts having abutting faces, a clamp for securing said struts together, and a member having serrations thereon and secured to one of said abutting faces and adapted to grip the other of said faces, said serrations being disposed at substantially right angles to the longitudinal axis of said member, said member being inclined so as to cause said serrations to be positioned at an angle with respect to the longitudinal axis of said struts.

5. In a device of the class described, the combination with a pair of overlapping struts having abutting faces, a clamp for securing said struts together, and a pair of members having serrations thereon and located between said abutting faces and arranged to define an acute angle.

6. In a device of the class described, the combination with a pair of overlapping struts having abutting faces, a clamp for securing said struts together, and a pair of members having serrations thereon and located between said abutting faces to supplement said clamp in securing said struts against relative slippage, said serrate members being arranged to define a V.

Signed at Chicago this 8th day of May, 1929.

GEORGE B. BOSCO.